United States Patent [19]

Nausedas

[11] Patent Number: 4,606,379

[45] Date of Patent: Aug. 19, 1986

[54] ARTICLE FOR CONTROLLING CASING DEPLETION

[75] Inventor: Joseph A. Nausedas, Oak Forest, Ill.

[73] Assignee: Union Carbide Corporation, Danbury, Conn.

[21] Appl. No.: 481,034

[22] Filed: Mar. 31, 1983

[51] Int. Cl.⁴ .......................................... F16L 11/12
[52] U.S. Cl. ................... 138/118.1; 138/109; 17/1 R; 17/41
[58] Field of Search ............... 138/118.1, 121, 122, 138/109; 17/1 R, 41, 42, 49; 426/105, 135, 138

[56] References Cited

U.S. PATENT DOCUMENTS

| | | | |
|---|---|---|---|
| 2,754,538 | 7/1956 | Maier | 138/118.1 X |
| 2,863,167 | 12/1958 | Nordin | |
| 2,871,508 | 2/1959 | Hill | 17/41 |
| 3,115,668 | 12/1963 | Townsend | |
| 3,122,779 | 3/1964 | Blechschmidt | 17/41 |
| 3,451,098 | 6/1969 | Myles et al. | 17/41 X |
| 3,726,059 | 4/1973 | Cherio et al. | |
| 3,964,128 | 6/1976 | Townsend et al. | |
| 3,975,795 | 8/1976 | Kupcikevicius et al. | 17/41 |
| 4,017,941 | 4/1977 | Raudys et al. | |
| 4,023,238 | 5/1977 | Phares | 17/41 |

FOREIGN PATENT DOCUMENTS 1167377 10/1969 United Kingdom ............. 138/118.1

OTHER PUBLICATIONS

Shirmatic Sizer Model 400F Instruction Manual, Apr. 1977, pp. 6.8, 11.15 and 11.16.

Primary Examiner—James E. Bryant, III
Attorney, Agent, or Firm—Roger R. Aceto

[57] ABSTRACT

A casing article which includes a tubular core member and a length of shirred casing disposed on the core with its inner periphery in gripping engagement about the core. A deshirring control is carried by the core and engages a rear portion of the shirred casing. The deshirring control prevents forward movement of the rear portion of shirred casing until all the shirred casing forward of the control has deshirred so that any forward movement of the trailing end of the shirred casing can be taken as a true indication of the depletion of casing from the shirred strand.

11 Claims, 6 Drawing Figures

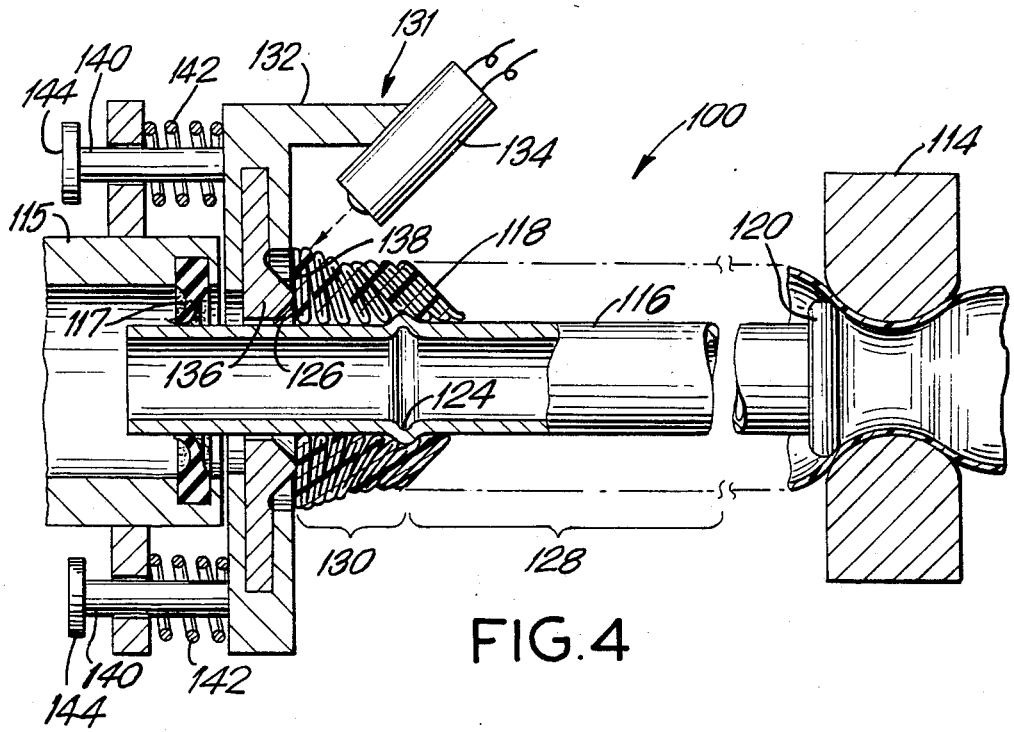
FIG.4
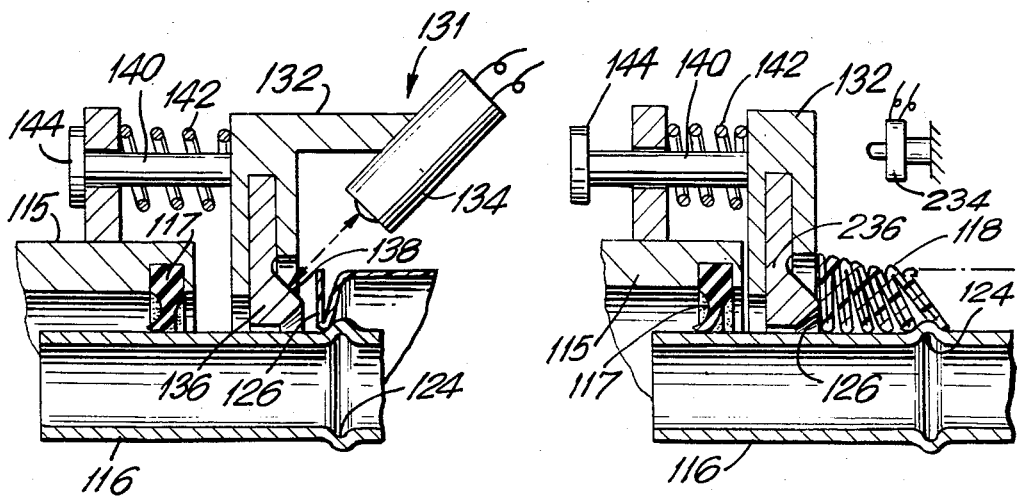
FIG.5
FIG.6

4,606,379

ARTICLE FOR CONTROLLING CASING DEPLETION

BACKGROUND OF THE INVENTION

The present invention relates generally to a cored, shirred casing article, method and apparatus for use in automatic stuffing operations. More particularly the invention relates to such an article including means for controlling the deshirring of the casing from the article so as to permit accurate detection of the depletion of casing by the control mechanism of the stuffing apparatus. In its method aspect the invention relates to the use of such an article in detecting the depletion of casing and controlling the termination of a stuffing operation in response to such detection.

Shirred casing articles are commonly used in automatic stuffing operations to improve the rate of producing encased food products. These casing articles contain a relatively long length of casing which has been shirred and compacted to a relatively short length called a "shirred casing stick". For example, a stick less than 20 inches long may contain a continuous length of casing measuring as much as 160 feet or more in length. These sticks are sufficiently coherent so that they can be handled by the mechanical loading apparatus of a stuffing machine.

In a high speed, automatic stuffing operation, such as the production of frankfurters, the entire supply of casing contained in a casing stick is depleted in a matter of less than a minute. Because of the rapidity with which the shirred casing stick stuffed, it is important for the stuffing machine to be able to detect when the supply of casing in a stick is about to become depleted. This allows the machine controls to stop the stuffing operation just prior to the depletion of the casing supply so that a fresh stick can be brought into a stuffing position.

In frankfurter production, a common method of detecting casing depletion is to place the casing stick over the stuffing horn at the start of the stuffing operation, and then bias the stick towards the discharge end of the stuffing horn. This is done by a push rod biased against a ring contacting the trailing end of the casing stick. As casing is stuffed and deshirred from a fore end of the casing stick, the push rod urges the remaining shirred portion of the stick towards the discharge end of the stuffing horn. The position of the push rod, which is positioned against a ring contacting the trailing end of the casing stick, in effect monitors the position of the end of the casing stick. Accordingly the approach of the push rod towards the discharge of the stuffing horn is used to indicate depletion of the casing and to control the termination of the stuffing operation.

While push rods or other similar casing contacting sensors can be relied upon to monitor the end of a conventional casing stick, the advent of cored casing sticks has made it necessary to find other means for indicating the impending depletion of casing.

A cored casing stick has a rigid tubular core disposed within the bore of the casing stick. A shirred casing stick which includes a substantially rigid tubular core offers several advantages over more conventional, uncored sticks. For example, the core provides the casing stick with greater coherency so that the stick is less likely to break during the rigors of automatic handling. Another advantage is that the tubular core can itself function as a disposable stuffing horn which is discarded after a single use. Cored casing sticks can be made to contain greater lengths of casing than uncored sticks, which is important for increasing production in automatic stuffing operations.

Briefly, to make a cored casing stick, a strand of shirred casing, preferably a compacted strand, is pushed over a rigid tubular core. As an alternative, a strand of shirred casing can be compacted directly on to a core. A further alternative is to shirr directly on to a core with or without subsequent compacting. In any event, the inside diameter of the shirred casing strand and the outside diameter of the tubular core are selected so that the inner periphery of the shirred casing strand will contact about the outer periphery of the core, preferably over substantially the full length of the casing strand. Moreover, this contact between the casing strand and tubular core should be sufficient to provide a resistance to relative motion between the strand and the core.

When using a cored casing stick, the tubular core is mounted over a stuffing horn or the stuffing horn can be eliminated and its function assumed by the tubular core. However, regardless of how the cored casing stick is used, the trailing end of the casing strand cannot be pushed along the core towards the stuffing horn discharge as with uncored sticks. This is due to the resistance to relative motion provided by the contact between the core and the casing strand. Accordingly, the conventional push rod arrangement for monitoring the position of the trailing end of the casing strand is inappropriate when using cored casing sticks.

There is still another characteristic of cored casing sticks which makes it difficult for conventional monitors to accurately indicate depletion of casing. In this respect, the resistance to relative motion between casing strand and core tends to decrease towards the ends of the casing strand. Various factors contribute to this.

For example, the inherent resiliency of the shirred casing strand tends to cause it to expand axially. This axial expansion loosens the casing on the core and works to at least partly reduce the resistance to relative motion between the casing strand and core, particularly adjacent to the ends of the casing strand. The material of the core, its surface finish, amount of compaction, etc., are all variables which have a bearing on the resistance to relative motion between the casing strand and core.

For the most part this resistance is sufficient to maintain the unshirred portion of casing strand anchored to the core while casing deshirrs from the casing strand. That is, the magnitude of this resistance is greater than the force required to deshirr casing from the strand. However, as casing deshirrs from the strand, the length of the strand decreases. As the strand length decreases, the resistance to relative motion between a remaining portion of the strand and the core decreases. If a point is reached where this resistance falls below the deshirring force, the entire remaining portion of casing strand will break free and begin to slide axially along the core responsive to the deshirring force. Accordingly, movement of the trailing end the casing strand under these circumstances may not reflect the true amount of casing remaining in the strand. For example, sensors designed to initiate termination of the stuffing operation responsive only to movement of the trailing end of the strand will activate prematurely if the remaining portion of the strand contains a relatively long casing length. That is, stuffing may terminate before all the usable casing has been depleted.

In the present invention movement along the core of the trailing end of the casing is controlled and made predictable so that sensors monitoring the end of a casing can correctly indicate the depletion of the casing. This is accomplished by providing a means carried by the core which engages the casing and controls the movement of the trailing end of the casing so that the depletion of casing can be accurately indicated by sensors monitoring the position of the trailing end of the casing.

SUMMARY OF THE INVENTION

The present invention can be characterized in one aspect thereof by a casing article including means for controlling the depletion of casing from the article including:

(a) a substantially rigid tubular core having a bore to accommodate passage of a food product being stuffed;

(b) a tubular strand of shirred casing carried by the core, the strand having a front portion including the fore end of the strand from which casing is first to deshirr, and a rear portion which lies aft of the front portion and which includes the trailing end of the casing;

(c) the tubular strand has its inner peripheral surface in gripping contact about the outer peripheral surface of the core to provide a resistance to relative motion between the strand and core, the magnitude of this resistance as provided by the rear portion decreasing as casing is deshirred from said rear portion until such resistance is less than the force required to deshirr casing from the strand; and (d) means carried by the core and engaging the rear portion for controlling the movement of the trailing end of the casing responsive to the deshirring of casing from the strand, the means being adapted and arranged to prevent such movement of the trailing end until substantially the complete deshirring of the front portion and at least the partial deshirring of the rear portion has obtained.

In its method aspect, the present invention can be characterized by the steps of:

(a) providing a casing article including a hollow, substantially rigid tubular core and a shirred strand of casing on the core, said strand having a fore end from which casing is first to deshirr and a rear portion which contains the trailing end of the strand and which is last to deshirr, the casing and core being in sufficient contact over the length of the strand to provide a resistance to relative motion between the strand and core, the magnitude of the resistance as provided by the rear portion alone decreasing as casing is deshirred from the rear portion until such resistance is less than force required to deshirr casing from the strand;

(b) mounting the casing article to a stuffing apparatus such that the product being stuffed will pass through the hollow tubular core;

(c) stuffing the product through the tubular core and into the casing thereby creating a deshirring force sufficient to effect the deshirring of casing from the fore end of the strand;

(d) continuing the stuffing step until the supply of casing contained in the strand of shirred casing is substantially exhausted up to the rear portion;

(e) simultaneously restraining the trailing end of the shirred strand against longitudinal movement along the core responsive to the deshirring force;

(f) releasing the trailing end for longitudinal movement along the core when the rear portion is at least partly deshirred;

(g) detecting the longitudinal movement of the trailing end; and (h) initiating the termination of the stuffing step responsive to the longitudinal movement of the trailing end.

DESCRIPTION OF THE DRAWINGS

FIG. 4 is a view similar to FIG. 1 only showing another embodiment of the invention;

FIG. 5 is a view showing the FIG. 4 embodiment near the end of the stuffing cycle; and FIG. 6 is a view similar to FIG. 4 showing another embodiment of the invention.

DESCRIPTION OF THE PREFERRED EMBODIMENTS

Figure 1:
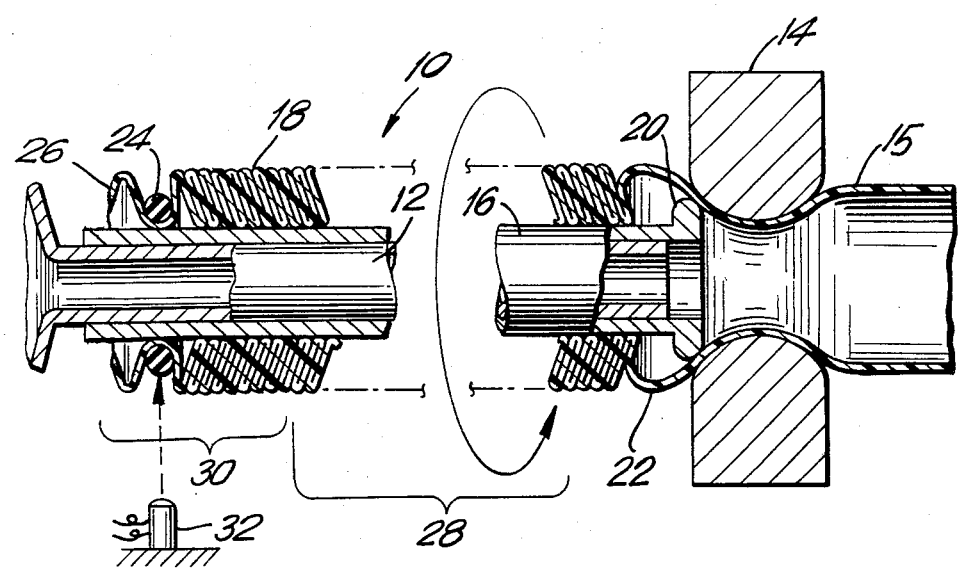
FIG. 1 is a diagramatic view showing a cored casing article according to the present invention in place on a stuffing apparatus at the start of a stuffing cycle.

Referring to the drawings, FIG. 1 shows the cored casing article of the present invention generally indicated at 10 in place on a high speed stuffing machine as may be used to make frankfurters and the like. A typical automatic stuffing machine as may be used in the production of frankfurters is shown is U.S. Pat. No. 3,115,668. Since the machine itself forms no part of the invention, only those components as may be necessary to an understanding of the present invention are described. These components include a stuffing horn 12 and a rotating chuck 14.

Briefly, a machine of the type described in U.S. Pat. No. 3,115,668 has its stuffing horn 12 extended through the bore of the cored casing article. The fore end of the casing article is engaged and rotated by a chuck 14 which spins the article about its longitudinal axis. The stuffed casing product 15 which is produced by the food product discharging from the stuffing horn and into the casing is also rotating as it leaves the rotating chuck. Linking of the casing is accomplished by other components of the stuffing machine (not shown) which cooperate with the spinning, stuffed casing at defined intervals to form individual frankfurter links.

As shown in FIG. 1 the cored casing article 10 includes a tubular core member 16 and a strand of shirred casing 18 which is in contact about the core. Preferably the strand is a compacted shirred strand of casing. In this respect the casing can be shirred and compacted in a conventional manner and then transferred to a core 16, or a strand of shirred casing can be transferred to the core and compacted directly on the core to produce the cored article 10.

Compaction of the shirred strand is not critical to the present invention, so the term "strand" or "casing strand" as used herein is intended to refer to a shirred strand of casing regardless of whether such strand has also undergone a compaction step. However, in a preferred form, the casing article 10 is a so called "cored high density" casing article as described in detail in a copending application Ser. No. 363,851 For purposes of this invention, it is sufficient to say that in a cored high density article, shirred strand 18 would be highly compacted on tubular core 16 to a pack ratio of between about 100 and 190 and a packing efficiency of at least about 0.50. The term "pack ratio" is the ratio of the unshirred length, in inches, of the casing in strand 18 divided by the final shirred and compacted length of the strand in inches. The term "packing efficiency" is a ratio indicative of the density of the compacted strand. It is computed by calculating the actual volume of casing contained in a given compacted strand, and then dividing by the volume of a solid object having the same dimensions as the compacted strand (i.e., length, inside diameter and outside diameter).

In any event, the inner surface of the strand preferably should be in sufficient gripping contact with the outer surface of the core to provide a resistance to relative motion therebetween. It is believed that selection of the relative size of the core and casing strand needed to provide the necessary magnitude of such resistance without damaging either the casing or core would be within the skill of the art.

The inside diameter of tubular core member 16 defines the bore of the cored casing article 10 so that during a stuffing operation, the stuffing horn 12 of the machine extends through the bore as it would with a more conventional (i.e. uncored) casing stick.

Adjacent the fore end of core 16 is a flange 20. This flange functions as an emulsion seal and also provides a surface which is gripped by rotating chuck 14 for rotating the cored casing article 10. In order to drive the casing article, the flange 20 and chuck 14 should have mating, complimentary surfaces. In addition, it should be noted that casing which is being deshirred, as indicated at 22, passes over this flange 20 and between the rotating chuck and the flange. Accordingly, the mating complimentary surfaces on the flange and chuck should permit the casing to pass easily and with low friction between these surfaces, and the chuck should not grip the flange with so great a force as to tear the casing passing between the flange and the chuck.

At the aft end of core 16 is an elastic band or other suitable means 24 which is carried by the core and placed over the trailing end 26 of the casing to hold this end of the casing against the core. The elastic band 24 functions as a means for controlling the release of the trailing end in that it tethers or anchors the trailing end of the casing to the core with sufficient force to prevent premature movement of the tailing end along the stuffing horn.

As the casing is stuffed, it deshirrs from the strand and the deshirred casing moves towards the right as viewed in the figures. As the strand deshirrs, the resistance to relative motion between the casing strand and core is sufficient to keep a forward, main body of compacted casing, as indicated at 28, fixed to, i.e. immobilized on, the core.

That is, the magnitude of this resistance is greater than the force required to deshirr the casing so that complete deshirring of the main body portion 28 may take place before any movement of the trailing end 26 occurs. However, as casing deshirrs from the strand, the length of the forward, main body portion 28 decreases. This decrease in the length of the shirred strand together with the aforementioned resilient axial expansion at the ends of the strand can reduce the magnitude of the resistance to relative motion as deshirring approaches the trailing end 26. In fact, when the forward, main body 28 is completely deshirred, a remaining rear portion of casing as indicated at 30 may not be able to resist the deshirring force. That is, the resistance to relative motion which exists between this remaining rear portion 30 and the core 12, may become less than the force required to deshirr the casing. If this relationship occurs, then the entire remaining rear portion 30 will break free of the core and begin to move longitudinally along the core responsive to the deshirring force exerted on the rear portion.

Moreover, the length of this remaining rear portion 30 may vary from casing article-to-casing article. This means that the movement of the trailing end 26 which is part of the remaining rear portion 30, may not be a true indication of casing depletion. Accordingly, movement of the trailing end 26 under these circumstances can not be relied upon to initiate termination of the stuffing operation.

Thus, the elastic band or means 24 which is placed about the trailing end 26 serves to prevent the premature movement of this trailing end until the complete deshirring of the remaining rear portion has occurred, so that the movement of the trailing end of casing can be relied upon as a true indication of casing depletion.

Figure 2:
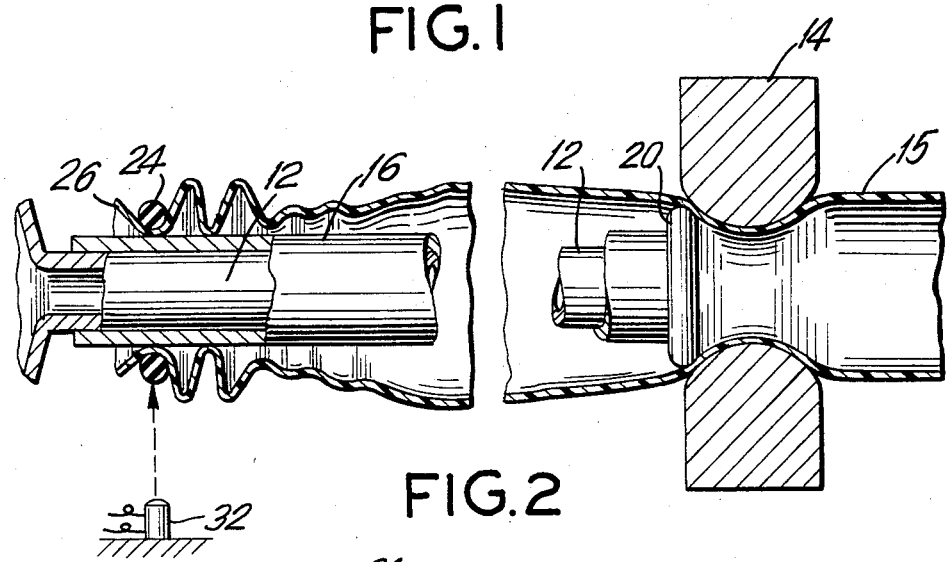
FIG. 2 is a view similar to FIG. 1 only closer to the end of the stuffing cycle.

In operation, stuffing causes the supply of casing contained in strand 18 to deshirr from the fore end of the casing article. At some point, as shown in FIG. 2, substantially the entire length of the strand, including the forward main body portion and rear portion, has been deshirred so there is little, if any, of the shirred strand left to resist the deshirring force exerted on the trailing end. However, even with little or no casing left in the remaining rear portion, the elastic band 24 works to maintain the terminal end 26 of the casing tethered to the core 16.

Figure 3:
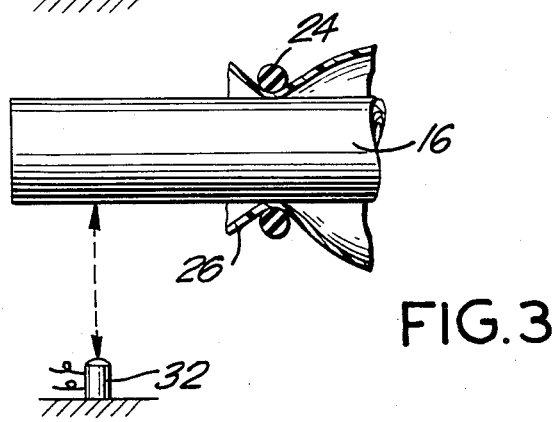
FIG. 3 is a view showing a portion of FIG. 2 just prior to the depletion of casing.

When all the casing has been deshirred, as shown in FIG. 3, continued stuffing of the casing will pull the trailing end 26 and, therefore, elastic band 24 along the core and towards the fore end of the core as shown in FIG. 3. Movement of the trailing end of the casing or of the elastic band can be detected by an appropriate sensor 32 on the machine. Any mechanical or other sensor known in the art can be used for this purpose. An electric eye is shown by way of example only. Such an electric eye could be of the type that emits a beam wherein the reflection of the beam is utilized to sense when the band 24 or the trailing end 26 moves. For example, the band or trailing end could reflect the beam so that movement of of either one interrupts reflection. In the alternative, the movement of the band or trailing end could allow reflection from the core surface. Either method, or other method that would occur to one skilled in the control art, could be used to sense movement of the band or trailing end.

Whichever method is used, the output of this sensor 32 upon movement of the band or trailing end can be used to reliably produce a control signal to initiate a timed termination of the stuffing operation just before the trailing end 26 of the casing reaches flange 20. At the end of the stuffing cycle, the trailing end of the casing is pulled over flange 20 and out through the rotating chuck while the elastic band, if it moves, is retained on the core by the flange.

Another embodiment of the invention is shown in FIGS. 4 and 5. Here, the tubular core of the casing article is shown as functioning as the stuffing horn. In addition, the sensor for detecting the depletion of casing includes a mechanical component able to accommodate the rotation of the casing wherein this mechanical component allows a sensor to track with the trailing end of the strand to indicate when the strand is completely deshirred.

Referring to FIG. 4, the casing article generally indicated at 100 includes a tubular core 116 having a flange 120 at its fore end. This flange is gripped by a rotating chuck 114 which is similar in operation and function to the rotating chuck 14 described herein above with respect to FIGS. 1 and 2.

The aft end of tubular core 116 is adapted to connect to the discharge of the stuffing apparatus indicated at 115. The discharge 115 of the stuffing apparatus in this embodiment is modified so as to provide a suitable gland seal 117. This seal allows the core to spin with respect to discharge 115 about the longitudinal axis of the core.

Disposed about and in contact with the core is a shirred casing strand 118. As with the embodiment of FIGS. 1–3, the shirred casing strand includes a forward main body portion 128 and a rear portion 130.

In the embodiment as shown in FIG. 4, the means carried by the core for controlling the release of the trailing end 126 of the casing strand is a raised projection of core material indicated at 124. Preferably, this core projection can be either a continuous ridge of core material as shown, or it can be a series of raised dimples formed from the core material. As an alternative, the projection could be a separate piece which is fixed to the core.

The projection 124 segregates rear portion 130 from the forward main body portion 128 of the casing strand. The function of this projection is to prevent premature longitudinal movement of the rear portion along the core responsive to the deshirring of casing from the strand. It has been found that the projection need not be extremely high for this purpose. For example, when using a conventional shirred strand of frankfurter size casing, disposed about a tubular core having an outside diameter of 0.50 inches, a projection measuring about 0.03 inches high was sufficient to hold a rear portion of the strand to the core as this rear portion was deshirred.

It is believed to be within the skill of the art to select the appropriate size and disposition of the projection for casing strands of other sizes.

The projection 124 can be formed either before or after the compacted casing is on the core. Any suitable tool can be used for this purpose wherein the tool is axially inserted into the core and pressed against the inner surface of the core to create the raised projection 124.

In cases where the projection is formed before the strand is placed on the core, the end of the stand, due to its resiliency, can still be pushed over the projection without damage to the casing. This force needed to push the strand onto the core would, of course, be greater than the force needed to deshirr casing from the strand.

Whether the projection 124 is formed before or after placing the casing strand on the core the projection can be positioned to retain a predetermined length of casing on the core after the forward main body portion is deshirred. Thus, in this embodiment the rear portion as indicated at 130 contains a predetermined quantity of casing which is prevented from moving towards the fore end of the core by projection 124 which engages against this rear portion 130. The length of rear portion 130 preferably is as short as possible, yet long enough to function with the particular end-of-casing sensor that is used. Also the rear portion should be long enough so that some deshirring of the rear portion must take place before the trailing end 126 moves. For frankfurter size casing rear portion 130 can be about 0.375 inches or less.

In addition to retaining a predetermined casing length, projection 124 also acts as a stop to prevent axial expansion of the forward main body portion 128 of the casing strand beyond this stop or to the left, as viewed in the Figures.

Rear portion 130, which is not restrained by the projection from axially expanding to the left as viewed in the Figures, is free to expand axially along the core away from projection 124. As will be further discussed hereinbelow, this axial expansion, if any, may loosen the grip of the rear portion on the core. Any resulting decrease in the resistance to relative motion between the rear portion and core will not effect the operation of the present invention.

In operation, stuffing of the casing 118 proceeds as described hereinabove with respect to FIG. 1, wherein deshirring occurs from the fore end of the stick. Deshirring continues until the supply of shirred casing contained in the main body portion 128 runs out. As casing deshirrs from the forward main body portion 128, the length of this portion decreases, which reduces the magnitude of the resistance to relative motion. However, the engagement of the projection 124 against the rear portion 130 prevents the rear portion from moving longitudinally responsive to the deshirring force even upon the complete deshirring of the forward main body portion 128. When all casing contained in the forward main body portion 128 has deshirred, casing will begin to deshirr at the projection 124 from the rear portion 130.

Since this rear portion was free to expand and loosen from the core, it is likely that at some point prior to the complete deshirring of the rear portion, the deshirring force will overcome any resistance to relative axial movement between the core and what shirred casing may remain in the rear portion 130. When this happens, what shirred casing as may remain in the rear portion will begin to move axially along the core and towards the projection 124. This, in effect, keeps the remaining rear portion butted against the projection as casing continues to deshirr. Eventually, the trailing end 126 will be carried to the projection and deshirred as shown in FIG. 5.

Movement of the trailing end 126 up to projection 124 can be detected by any appropriate follower which is biased against the trailing end 126 of the casing. When such a biased follower has moved up to the location of projection 124 any appropriate means such as a limit switch, can be operated in order to initiate the sequence for terminating the stuffing. In this embodiment, it should be appreciated that the position of the trailing end 126 does give a reasonably accurate indication of casing depletion because projection 124 prevents any movement of the trailing end until at least part of the rear portion has deshirred.

FIGS. 4 and 5 also show a preferred sensor means 131 for utilizing the deshirring control of the present invention to initiate termination of a stuffing operation. As shown in FIG. 4, this sensor includes a carriage 132 which is slidably mounted to the stuffing apparatus adjacent discharge 115. This carriage carries an appropriate sensor 134 such as electric eye sensor of the type described hereinabove. The carriage also carries a follower 136 which has a reflecting surface 138. The reflecting surface is set at an angle to the longitudinal axis of the casing article, this angle being close to the configuration of the trailing end 126 as formed by a conventional shirring operation.

The carriage is carried on slide rods 140 and is biased in a direction towards the trailing end 126 by springs 142. Any suitable means such as stops 144 on slide rods 140 can be used to limit the travel of the carriage. Preferably, the carriage need not travel much beyond the location of projection 124. With this arrangement follower 136 will remain against the trailing end 126 even though the trailing end may travel towards projection 124 as casing is deshirred from the rear portion 130.

If desired, follower 136 can be free to rotate with respect to carriage 132 so as to better accommodate the rotation of the casing article. Otherwise the follower preferably should be made of a low friction material to prevent damage to the rotating casing at the trailing end which rubs against the follower.

The electric eye sensor 134 is arranged at an angle to the trailing end so that any beam emitted by the sensor is reflected by the casing away from the sensor. However, when the trailing end 126 is deshirred or otherwise removed from over the reflecting surface 138, any beam emitted by the sensor 134 will be reflected back to the sensor. This reflection indicates casing depletion and can be used to initiate a sequence for terminating the stuffing operation.

The advantage of the sensor arrangement as shown in FIGS. 4 and 5 is that the sensor is able to track the movement of trailing end over a limited predetermined range to accurately sense casing depletion. For example, if the trailing end does not move, the sensor means 131 does not move and no reflection of the beam is seen by sensor 134 until the trailing end deshirrs and moves from between the sensor and reflecting surface 138. On the other hand, if the trailing end does move towards projection 124, sensor means 131 will follow along until the trailing end deshirrs either at projection 124 or at some point before reaching the projection. In neither case is indication of casing depletion given until after the trailing end 126 is removed from over reflecting surface 138.

A modified form of sensor is shown in FIG. 6. Here, a contact sensor 234 such as a micro switch is located at the approximate position of projection 124. A follower 236 is biased against the trailing end 126 for tracking any movement of the trailing end.

The deshirring of casing from the rear portion 130 will cause the follower 236 to move against contact sensor 234 when the casing is completely deshirred. When this occurs, the sensor 234 is activated to initiate the sequence of events to terminate stuffing.

Thus, it should be appreciated that the embodiments described provide means for controlling the release of the trailing end of the casing on a cored casing article during a stuffing operation so that a reliable indication of casing depletion can automatically be obtained and acted upon. In the embodiment shown in FIGS. 1-3, this control is effected by an external restraint 24 which releasably holds the terminal end of the casing to the core. In the embodiment as shown in FIG. 4-6, the control is effected by an internal restraint 124 which holds a predetermined quantity of casing, including the trailing end of the casing, at the rear of the core until the casing is depleted. The projection permits the controlled deshirring of this predetermined quantity to insure that any movement of the trailing end provides an accurate indication of casing depletion. Upon depletion of the casing, sensor means, as described herein, initiates a sequence to shut down the stuffing operation.

While the invention has been described as being used with a stuffing machine which rotates the casing during a stuffing operation, the invention is equally applicable to stuffing machines which do not rotate the casing during the stuffing operation. In the latter application, the core of the casing article may or may not require a flange on its fore end as described.

Having thus described the invention in detail which is claimed as new is:

1. A tubular casing article for use in producing encased food products, said article comprising:
    (a) a substantially rigid tubular core, said core having an axial bore to accommodate passage of a food product;
    (b) a tubular strand of shirred casing carried by said core, said strand including a fore end from which casing is first to deshirr, and a trailing end which is last to deshirr;
    (c) said tubular strand of shirred casing having its inner peripheral surface over substantially its full length in gripping contact about the outer peripheral surface of said core to provide a resistance to relative motion between said strand and tubular core, the magnitude of said resistance decreasing as casing is deshirred and pulled forward from said strand until said gripping contact of a remaining rear portion of said shirred strand is insufficient to resist, and is less than, the force required to deshirr and pull casing forward from said strand; and
    (d) means solely carried by said core and engaging said rear portion for preventing the movement of said trailing end relative to said core until the complete deshirring of said casing strand forward of said means and at least the partial deshirring of said rear portion has obtained.

2. A casing article as in claim 1 wherein said rear portion contains a predetermined length of casing.

3. A casing article as in claim 1 wherein said means is a member on said core which segregates a forward portion of the shirred strand from said rear portion.

4. A casing article as in claim 1 wherein said means is a projection on the outer peripheral surface of said core, said projection being sufficient to prevent said trailing end from moving longitudinally past said projection prior to at least the partial deshirring of said rear portion.

5. A casing article as in claim 4 wherein said projection is formed from the material of said core.

6. A casing article as in claim 1 wherein said means releasably holds the trailing end of said strand to said core and releases said trailing end for movement along said core upon complete deshirring of said rear portion.

7. A casing article as in claim 1 wherein said means is a band disposed about the trailing end of said strand for releasably holding said trailing end to said core.

8. A casing article as in claim 7 wherein said band is arranged for movement along said core responsive to a deshirring force being exerted on said trailing end after substantially complete deshirring of said rear portion.

9. A casing article as in claim 8 wherein said core has a fore end adjacent with the fore end of said strand of shirred casing, the fore end of said core having a flange adapted to prevent longitudinal movement of said band off of said core.

10. A casing article as in claim 1 wherein said core is adapted to mount to a stuffing horn of a stuffing machine.

11. A casing article as in claim 1 wherein said core is adapted to function as the stuffing horn of a stuffing machine.

* * * * *